United States Patent [19]
Yung-Chou

[11] Patent Number: 6,014,130
[45] Date of Patent: Jan. 11, 2000

[54] MOUSE ENCODING DEVICE

[75] Inventor: Chung Yung-Chou, Taipei, Taiwan

[73] Assignee: Primax Electronics Ltd., Taiwan

[21] Appl. No.: 09/058,723

[22] Filed: Apr. 10, 1998

[30] Foreign Application Priority Data

Jan. 20, 1998 [TW] Taiwan .................................. 87200987

[51] Int. Cl.[7] .................................. G09G 5/08; G09G 5/00
[52] U.S. Cl. ........................ 345/163; 345/166; 345/156; 341/35; 250/231.15; 250/221
[58] Field of Search ...................................... 345/163–166, 345/156, 157, 158, 145; 463/37; D14/117.2, 117.3; 341/20, 35, 173; 250/221, 231.14, 231.15, 231.16, 231.17, 231.18

[56] References Cited

U.S. PATENT DOCUMENTS

| | | | |
|---|---|---|---|
| 5,446,481 | 8/1995 | Gillick et al. ........................... | 345/163 |
| 5,530,455 | 6/1996 | Gillick et al. ........................... | 345/163 |
| 5,808,568 | 9/1998 | Wu ........................................... | 341/20 |
| 5,912,661 | 6/1999 | Siddiqui ................................... | 345/166 |
| 5,917,473 | 6/1999 | Yeh .......................................... | 345/163 |

*Primary Examiner*—Lun-Yi Lao
*Assistant Examiner*—Jimmy H. Nguyen
*Attorney, Agent, or Firm*—Lawrence A. Maxham; Baker & Maxham

[57] ABSTRACT

A mouse encoding device that includes an operating interface for the user to operate on and a sensing device for sensing user input through the operating interface in order to modulate light pulses and generate encoded electrical signals. Through the rotation of a wheel in the mouse device, a mechanically linked photo-grid wheel is driven to generate a series of encoded signals. Furthermore, the wheel can move slightly in the vertical direction so that an activating switch can be turned on or off to produce yet another signal. Therefore, the movement of a mouse by a user is fully tracked.

7 Claims, 3 Drawing Sheets

MOUSE ENCODING DEVICE

CROSS-REFERENCE TO RELATED APPLICATION

This application claims the priority benefit of Taiwan application Ser. No. 87200987, filed Jan. 20, 1998, the full disclosure of which is incorporated herein by reference.

BACKGROUND OF THE INVENTION

1. Field of Invention

The present invention relates to an interface module for generating encoded signals. More particularly, the present invention relates to a module for generating encoded signals from a mouse.

2. Description of Related Art

The mouse is a very common peripheral device that can be used to control the movement of a cursor in a window environment or to select software. In the past, most personal computer systems have had a mouse with two-dimensional control. A mouse with two-dimensional control is able to control the movement of a cursor in an X-Y plane, and it has buttons to carry out software selection, too.

As technology progresses, a convenient operating interface becomes highly desirable. A conventional mouse with two-dimensional control can only move the cursor in an X-Y plane. Nowadays, this no longer meets our requirements. Therefore, a mouse with three-dimensional control is now appearing in the market. A three-dimensional mouse is able to encode the data of one more dimensions, and the extra dimension can be used for controlling the functions in several different window systems (such as scrolling up or down a window screen). Hence, a three dimensional mouse is a versatile peripheral input device.

In light of the foregoing, there is a need to provide a module for implementing the encoding of three-dimensional data of a mouse.

SUMMARY OF THE INVENTION

Accordingly, the present invention is to provide a structurally simple, cost effective and easy to assemble mouse capable of encoding three-dimensional data for future generations of computers.

In one aspect, the invention provides a mouse encoding device. The mouse encoding device is conveniently installed on a mouse circuit board so that the user can easily operate the encoding device, wherein the encoded signals are obtained through modulating an optical transmission system.

To achieve these and other advantages and in accordance with the purpose of the invention, as embodied and broadly described herein, the invention provides a mouse encoding device comprising a first supporting block having a first protruding rod and a first positioning hole; a second supporting block having a cylindrical hole, a second positioning hole and a bearing hole, a supporting base being formed through sliding the first protruding rod of the first supporting block into the cylindrical hole and fixing the assembled unit onto the mouse circuit board; a first wheel, whereby through coupling one end of the bearing spindle of the first wheel to the first positioning hole of the first supporting block while the other end of the bearing spindle to the second positioning hole of the second supporting block, the first wheel is allowed to rotate and movement of the bearing spindle in a vertical direction is also permitted; a photo-grid wheel having one end of a wheel axle piercing through the bearing hole of the second supporting block and coupling with the internal rim on one side of a wheel frame, so that when the first wheel rotates, the photo-grid wheel will also turn as well, and furthermore, on the surface of the photo-grid wheel, there is a medium for generating encoded signals through modulating optical transmission; a light-emitting diode located on one side above the mouse circuit board, used as a light source that shines through the media for encoding signals in the photo-grid wheel; and a photo-sensor located on the other side of the photo-grid wheel above the mouse circuit board for receiving the light coming from the light-emitting diode through the medium and generating electronic signals. In addition, the internal rim on one side of the first wheel has a teeth-profile that can mesh with the teeth-shaped element at one end of the wheel axle of the second wheel. Moreover, the teeth-shaped element engages with the internal rim on one side of the first wheel at its lowest point in order to prevent the movement of the first wheel assembly from interfering with the teeth-shaped element. Furthermore, the media for encoding signal is located on the photo-grid wheel surface, and is comprised of a plurality of slits distributed around the circumference of the wheel.

The mouse encoding device of this invention further comprises the following elements. There is a torsion spring slipped into the second protruding rod of the first supporting block. The first arm of the spring presses against the bearing spindle of the first wheel and the second arm of the spring presses against a protruding hook on the first supporting block in order to supply some spring loading to the movement of the first wheel. There is a plurality of protruding spots distributed evenly around the circumference on one side of the first wheel. An L-shaped spring plate is mounted between the first supporting block and the second supporting block by sliding the first protruding rod of the first supporting block into a circular hole in the L-shaped spring plate. The L-shaped spring plate also has a pointed tip for touching the protruding spots of the first wheel so that when the wheel rotates a sense of movement is felt by the user. An activating switch is located on the far side of the first supporting block away from the first wheel and is fixed underneath the bearing spindle so that when the first wheel is under pressure and rotates, the switch opens. Finally, there is an end cap having a third protruding rod that fits inside the cylindrical hole in the second supporting block and a circular hole for accommodating the axle of the photo-grid wheel so that movement along the axle direction when the photo-grid wheel is driven is forbidden.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
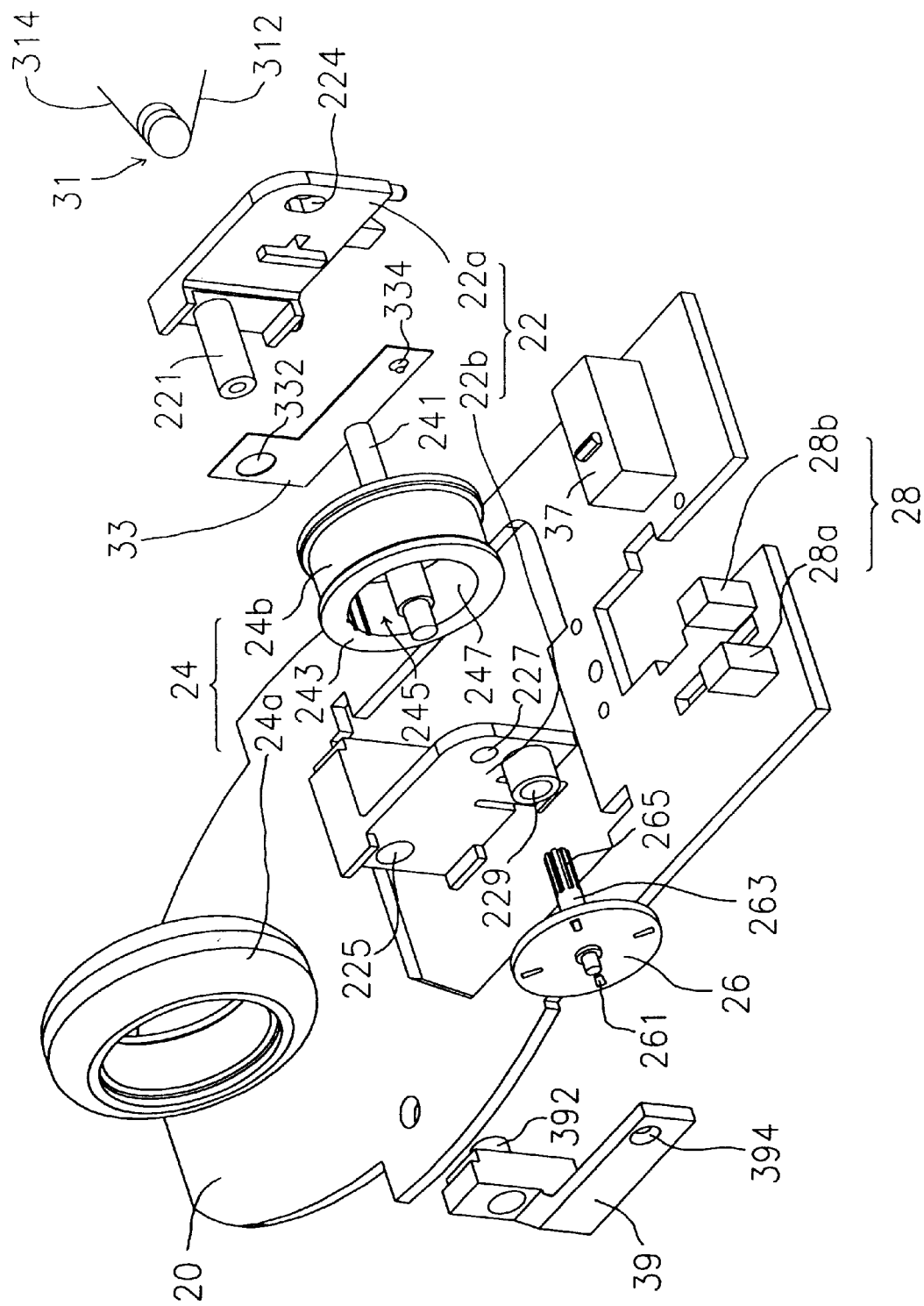
FIGS. 1 and 2 are perspective view from two different angles showing the components for forming the mouse encoding device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
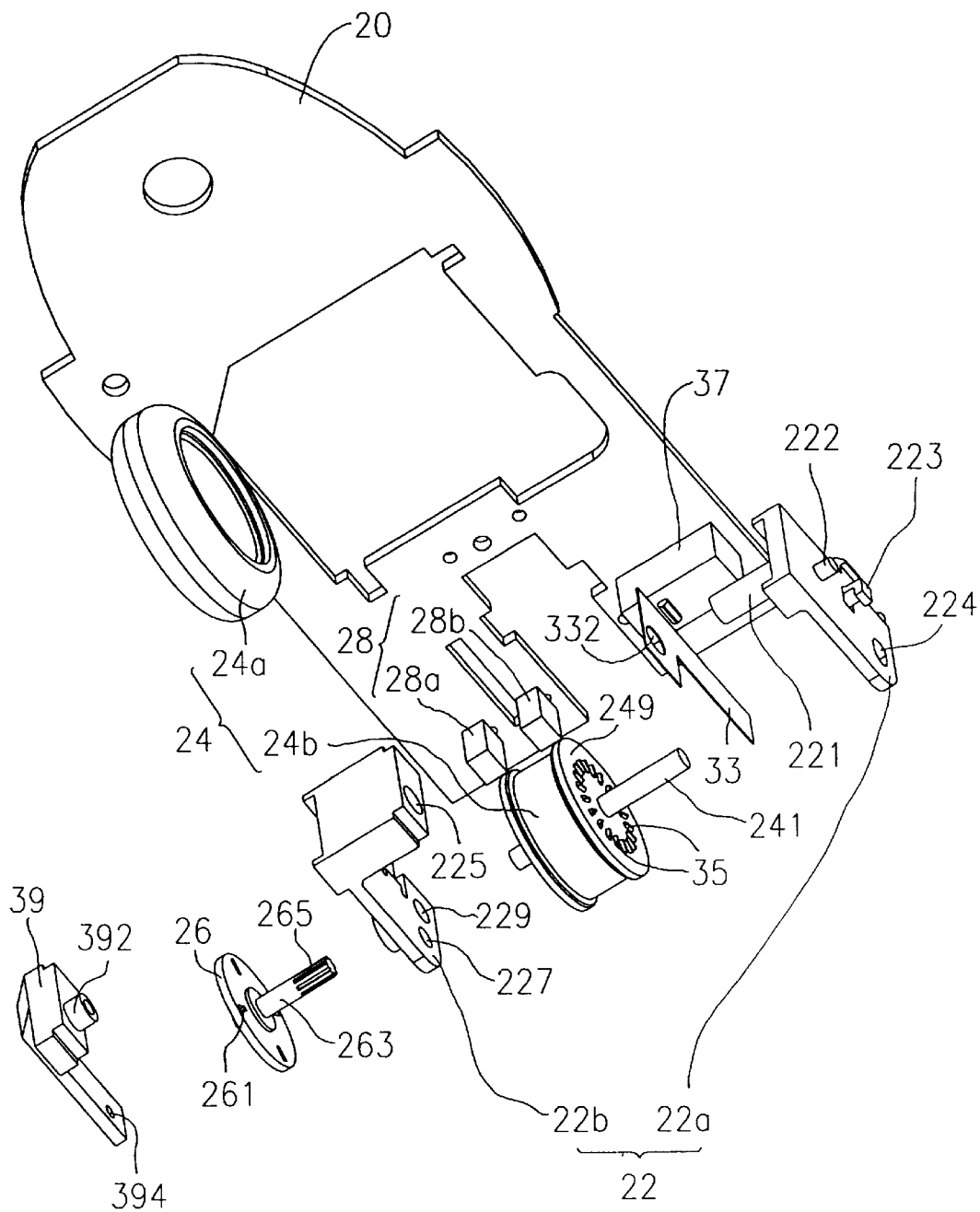

FIGS. 1 and 2 are perspective view from two different angles showing the components for forming the mouse encoding device according to one preferred embodiment of this invention. In this embodiment, the mouse-encoding device is mounted onto a mouse circuit board 20. The mouse-encoding device comprises a supporting base 22, a first wheel 24, a second wheel 26 and an encoded signal generator 28. The supporting base 22 and the first wheel 24 together constitutes an operating interface for the user. The second wheel 26 can be a photo-grid wheel, and the encoded signal generator 28 can be a sensor assembly, for example. The photo-grid wheel 26 together with the sensor assembly 28 constitutes a sensor system. Tracking the movement of the user, the operating interface in turn modulates the transmission of light and is thereby able to generate the required encoded signals through an optical media.

The supporting base 22 includes a first supporting block 22a and a second supporting block 22b. The first supporting block 22a further includes a first protruding rod 221, a second protruding rod 222, a protruding hook and a first positioning hole 224.

The second supporting block 22b further includes a cylindrical hole 225, a second positioning hole 227 and a bearing hole 229.

The first wheel 24 has a construction similar to the tire of a car, and is composed of a tire 24a and a wheel frame 24b. The tire 24a, for example, can be made from rubber. The rubber tire is a contacting part when the user is operating the mouse-encoding device. There is a bearing spindle 241 passing through the center of the wheel frame 24b. On one side 243 of the wheel 24b, an opening space 245 is formed. In the internal rim 247 of the opening space 245, a surface having gear teeth is formed.

The second wheel 26 or the photo-grid wheel contains a medium for encoding and generating signals through optical transmission. For example, the photo-grid wheel has a number of slits 261 distributed around the circumference of the wheel surface. Furthermore, the photo-grid wheel 26 includes a wheel axle 263 one end of which contains a tooth-shaped element 265.

The signal encoding device or the sensor assembly 28 of this embodiment comprises a light-emitting diode 28a and a photo-sensor 28b. The light generated by the light-emitting diode 28a shines through the signal encoding medium 261, which is then received by the photo-sensor 28b. The photo-sensor 28b then converts the optical signals into electrical signals before passing them on to the mouse circuit board 20.

Figure 3:
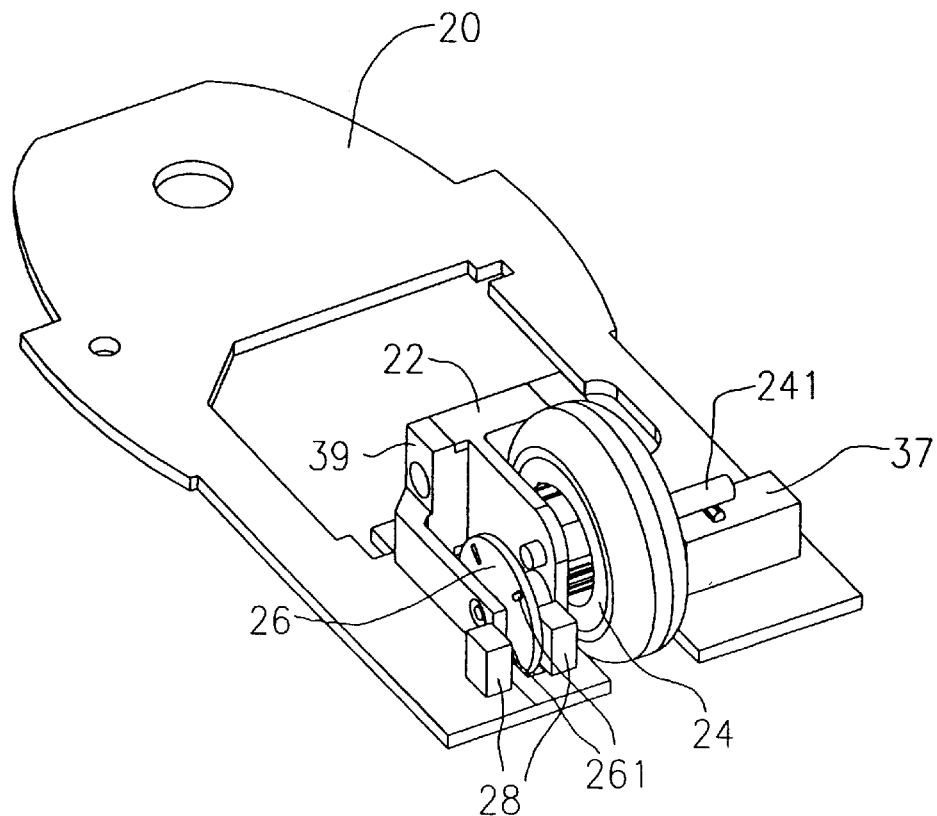
FIGS. 3 and 4 are perspective view from two different angles showing all the components as shown in FIGS. 1 and 2 assembled together to form the mouse encoding device.
Figure 4:
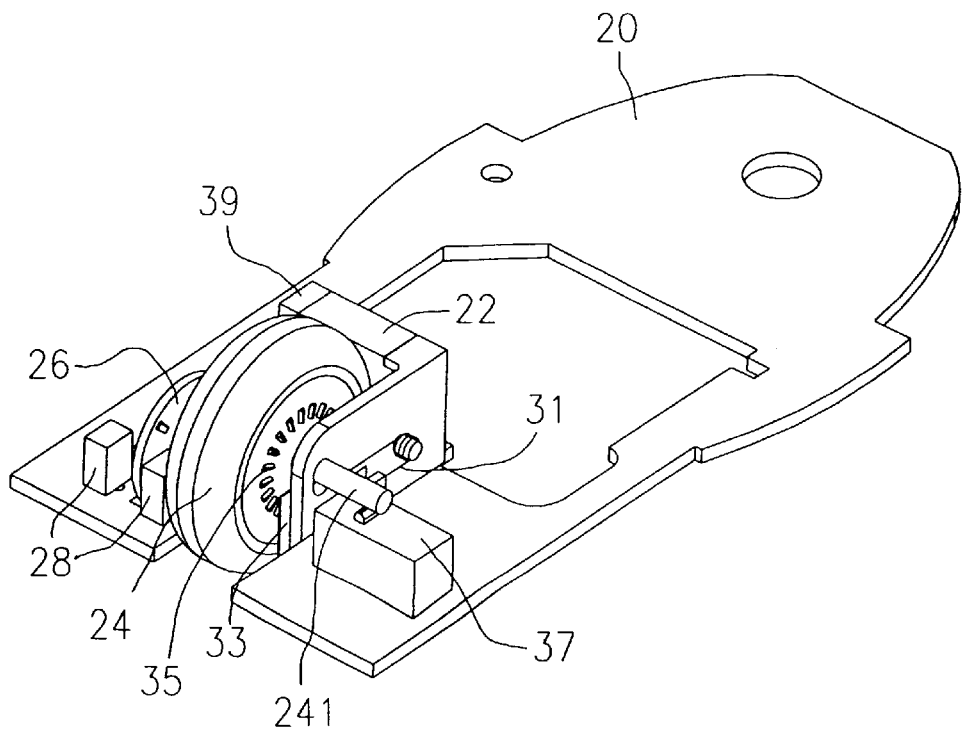

FIGS. 3 and 4 are perspective view at two different angles showing all the components as shown in FIGS. 1 and 2 assembled together to form the mouse encoding device. As shown in FIGS. 3 and 4, the mouse encoding device of this invention further comprises a torsion spring 31, an L-shaped spring plate 33, a number of protruding spots 35, an activating switch 37 and an end cap 39. The torsion spring 31 has a first arm 312 and a second arm 314, the L-shaped spring plate 33 has a circular hole 332 and a pointed tip 334, the protruding sports 35 are distributed around the circumference on one side 249 of the first wheel frame 24b, the activating switch 37 is installed above the mouse circuit board 20 and the end cap has a third protruding rod 392 and a circular hold 394 in it.

The mouse-encoding device of this embodiment is assembled in the following manner. First, the L-shaped spring plate 33 is slipped onto the first supporting block 22a by inserting the first protruding rod 221 on the block 22a through the circular hole 332 in the plate 33. The two ends of the bearing spindle 241 of the first wheel 24 are engaged into the first positioning hole 224 of the first supporting block 22a and the second positioning hole 227 of the second supporting block 22b respectively. Then the first protruding rod 221 of the first supporting block 22a is pushed into the cylindrical hole 225 of the second supporting block 22b so that the first supporting block 22a and the second supporting block 22b combine to form a supporting base 22. The supporting base 22 is mounted onto the mouse circuit board 20. The first wheel system 24 is mounted onto the supporting base 22 by its bearing spindle 241, and the L-shaped spring plate 33 that slipped onto the first protruding rod 221 is fixed in position between the side 249 of the first wheel 24 and the first supporting block 22a. The pointed tip 334 on the L-shaped spring 33 touches the protruding spots 35 on side 249 of the first wheel 24. Therefore, when the first wheel 24 rotates, the protruding spots 35 contact the pointed tip 334 sequentially. With this arrangement, a sense of movement will be fed back to the user of the mouse-encoding device. In addition, the first positioning hole 224 has an oval shape while the second positioning hole 227 has a circular shape. Hence, one end of the bearing spindle 241 within the second hole 227 is fixed in position, but the other end of the bearing spindle 241 can move up and down vertically in the oval shape hole 224. The torsion spring 31 is slipped onto the second protruding rod 222 on the first supporting block 22a. Its first arm 312 presses on the bearing spindle 241 that protrudes out of the first supporting block 22a after passing through the first positioning hole 224, and the second arm 314 presses on the inside of the protruding hook 223. Thus, the torsion spring 31 is able to provide some spring loading to the first wheel 24 as it moves up and down. The activating switch 37 is installed above the mouse circuit board 20 and below the bearing spindle 241 that protrudes out of the first supporting block 22a. Therefore, when the wheel 24 is down, the switch 37 is on for transmitting an electrical signal to the mouse circuit board 20.

The wheel axle 263 of the photo-grid wheel 26 passes through the bearing hole 229 of the second supporting block 22b so that the tooth-shaped element 265 at one end of the wheel axle 263 can mesh with the teeth on the internal rim 247 of the first wheel 24. Therefore, when the first wheel 24 rotates, the photo-grid wheel 26 will rotate correspondingly. Because one end of the spindle 241 of the first wheel 24 can move up and down, it is preferable to position the element 265 such that it engages with the teeth at the lowest point of the internal rim surface 247 to prevent mutual interference. The light-emitting diode 28a and the photo-sensor 28b in the signal encoding assembly 28 are mounted on two sides of the photo-grid wheel 26 above the mouse circuit board 20. Due to the presence of slits on the wheel 26 as a medium for generating encoded signals, light emitted by the light-emitting diode 28a will be intermittently cut off, resulting in a train of optical pulses received by the photo-sensor 28b. The optical pulses are converted to electrical signals in the photo-sensor 28b, and then passed to the mouse circuit board 20 to complete the process of generating encoded signals according to this invention. Finally, to prevent lateral shifting of the photo-grid wheel 26 when it is driven by the first wheel, an end cap 39 is used. The third protruding rod 392 of the end cap slips into the cylindrical hole 225 of the second supporting block 22b, and the other end of the axle 263 on the opposite side of the tooth-shaped element 265 slips into the circular hole 394.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mouse encoding device comprising:
   a supporting base;
   a first wheel having a bearing spindle at the center with two ends of the spindle supported by the supporting base so that the first wheel is free to rotate;
   a second wheel having an axle mechanically coupled to an internal rim on one side of the first wheel, so that when the first wheel rotates, the second wheel will also rotate, the second wheel further including a medium for generating encoded signals; and
   an encoded signal generator for generating a series of encoded signals corresponding to the medium on the second wheel.

2. The device of claim 1, wherein the first wheel includes a wheel frame having a bearing spindle and a tire outside the wheel frame.

3. The device of claim 1, wherein the internal rim surface on one side of the first wheel has teeth meshing mechanically with a tooth-shaped element at one end of the axle of the second wheel when assembled together.

4. The device of claim 3, wherein the tooth-shaped element at one end of the axle of the second wheel couples with the internal rim surface of the first wheel at its lowest point, in order to prevent interference between the teeth surface of the first wheel and the tooth-shaped element of the second wheel.

5. The device of claim 1, wherein the second wheel is a photo-grid wheel and the medium for generating encoded signals comprises a plurality of slits distributed around the circumference on the wheel surface, the encoded signal generator that works with the photo-grid wheel further including:
   a light emitting diode located on one side of the photo-grid wheel for producing light that passes through the slits on the photo-grid wheel for generating encoded signals; and
   a photo-sensor located on the other side of the photo-grid wheel for receiving the encoded light pulses from the light emitting diode and converting it into electrical signals.

6. The device of claim 1, wherein the supporting base further includes:
   a first supporting block comprising a first protruding rod and a first positioning hole so that even when one end of the bearing spindle of the first wheel is inserted into the first positioning hole the bearing spindle can still move in a vertical direction; and
   a second supporting block comprising a cylindrical hole, a second positioning hole and a bearing hole, wherein said supporting base is formed through the insertion of the first protruding rod of the first supporting block into the cylindrical hole of the second supporting block, the other end of the bearing spindle of the first wheel is able to fit tightly into the second positioning hole and one end of the axle of the second wheel is able to pass through the axle hole in the second supporting block in order to couple with the internal rim surface on one side of the first wheel.

7. The device of claim 6, wherein the device further includes:
   a torsion spring slipped into a second protruding rod of the first supporting block, with a first arm of the spring pressing against the bearing spindle of the first wheel assembly and a second arm of the spring pressing against the inside surface of a protruding hook on the first supporting block in order to supply some spring loading to the first wheel;
   a plurality of protruding spots distributed evenly around the circumference on one side of the first wheel assembly;
   an L-shaped spring plate mounted between the first supporting block and the second supporting block by sliding the first protruding rod of the first supporting block into a circular hole in the L-shaped spring plate, the L-shaped spring plate also having a pointed tip for touching the protruding spots of the first wheel sequentially so that as the wheel rotates, a sense of movement is felt by the user;
   an activating switch located on the far side of the first supporting block away from the first wheel and fixed underneath the bearing spindle so that when the first wheel is under pressure and rotates, the switch opens; and
   an end cap having a third protruding rod fitting inside the cylindrical hole in the second supporting block and a circular hole for accommodating the axle of a photo-grid wheel so that movement along the axle direction when the photo-grid wheel is driven is forbidden.

* * * * *